United States Patent
Zhu et al.

(10) Patent No.: US 11,974,359 B2
(45) Date of Patent: Apr. 30, 2024

(54) CONFIGURATION FOR LEGACY VOICE SUPPORT IN 5G

(71) Applicant: QUALCOMM Incorporated, San Diego, CA (US)

(72) Inventors: Xipeng Zhu, San Diego, CA (US); Juan Zhang, Beijing (CN); Gavin Bernard Horn, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 16/650,314

(22) PCT Filed: Sep. 28, 2018

(86) PCT No.: PCT/CN2018/108237
§ 371 (c)(1),
(2) Date: Mar. 24, 2020

(87) PCT Pub. No.: WO2019/072099
PCT Pub. Date: Apr. 18, 2019

(65) Prior Publication Data
US 2020/0275259 A1     Aug. 27, 2020

(30) Foreign Application Priority Data
Oct. 9, 2017   (WO) .............. PCT/CN2017/105341

(51) Int. Cl.
*H04W 8/24*       (2009.01)
*H04W 36/00*   (2009.01)
(Continued)

(52) U.S. Cl.
CPC ......... *H04W 8/24* (2013.01); *H04W 36/0022* (2013.01); *H04W 36/30* (2013.01); *H04W 88/06* (2013.01); *H04W 92/045* (2013.01)

(58) Field of Classification Search
CPC ... H04W 8/24; H04W 36/0022; H04W 36/30; H04W 88/06; H04W 92/045
See application file for complete search history.

(56) References Cited

U.S. PATENT DOCUMENTS 9,002,315 B2     4/2015  Song et al.
9,781,636 B2 *  10/2017  Watfa ................ H04W 36/0022
(Continued)

FOREIGN PATENT DOCUMENTS

CN     101047948 A    10/2007
CN     102783217 A    11/2012
(Continued)

OTHER PUBLICATIONS

3GPP TS 23.401: "3rd Generation Partnership Project General Packet Radio Service (GPRS) Enhancements for Evolved Universal Terrestrial Radio Access Network (E-UTRAN) access(Release 15)", V15.1.0, Sep. 30, 2017 (Sep. 30, 2017), pp. 31, 33, 117-120, 132-135, 144-146, 154-156, 161-163.
(Continued)

*Primary Examiner* — Charles N Appiah
*Assistant Examiner* — Frank E Donado
(74) *Attorney, Agent, or Firm* — Loza & Loza, LLP

(57) ABSTRACT

Aspects of the disclosure relate to systems and methods for configuring a voice domain preference and/or a radio access technology (RAT) preference for a user equipment (UE) in a radio access network (RAN) according to the capability and compatibility of the UE. The UE may send at least one of a requested voice domain preference or a requested RAT preference to a 5G core network (5GC). The UE may also
(Continued)

DUAL REGISTRATION receive, from the 5GC, at least one of a voice domain preference or a RAT preference based on, for example, the capability and compatibility of the UE. The 5GC may additionally generate a RAT/frequency selection priority (RFSP) index for the UE, giving priority to the voice domain preference and/or the RAT preference of the UE. The 5GC may communicate the RFSP index to the RAN. Other aspects, embodiments, and features are also claimed and described.

17 Claims, 17 Drawing Sheets

(51) Int. Cl.
*H04W 36/30* (2009.01)
*H04W 88/06* (2009.01)
*H04W 92/04* (2009.01)

(56) References Cited

U.S. PATENT DOCUMENTS

| | | | |
|---|---|---|---|
| 2006/0268848 A1 | 11/2006 | Larsson et al. | |
| 2008/0189360 A1 | 8/2008 | Kiley et al. | |
| 2010/0113010 A1* | 5/2010 | Tenny | H04L 47/10 455/437 |
| 2010/0234042 A1* | 9/2010 | Chan | H04W 36/0061 455/453 |
| 2012/0224563 A1* | 9/2012 | Zisimopoulos | H04W 36/24 455/435.2 |
| 2014/0235242 A1* | 8/2014 | Granzow | H04W 48/17 455/436 |
| 2014/0335791 A1* | 11/2014 | Kim | H04W 4/023 455/41.2 |
| 2014/0376360 A1* | 12/2014 | Lisak | H04L 65/1069 370/218 |
| 2015/0230094 A1 | 8/2015 | Bae et al. | |
| 2016/0007276 A1* | 1/2016 | Forssell | H04W 8/20 455/422.1 |
| 2016/0344572 A1* | 11/2016 | Brust | H04L 65/1016 |
| 2017/0048814 A1* | 2/2017 | Gotou | H04W 60/04 |
| 2017/0078938 A1* | 3/2017 | Pitkamaki | H04W 36/22 |
| 2018/0063764 A1 | 3/2018 | Bollapalli et al. | |
| 2018/0199281 A1* | 7/2018 | Huang-Fu | H04L 65/1059 |
| 2018/0295659 A1* | 10/2018 | Shan | H04W 76/12 |
| 2018/0359672 A1* | 12/2018 | Keller | H04L 67/141 |
| 2019/0089841 A1* | 3/2019 | Jeong | H04W 48/18 |
| 2019/0364541 A1* | 11/2019 | Ryu | H04W 80/10 |
| 2020/0337050 A1* | 10/2020 | Mildh | H04W 72/10 |
| 2021/0029618 A1* | 1/2021 | Jain | H04W 8/02 |
| 2021/0345336 A1* | 11/2021 | Mildh | H04W 72/56 |

FOREIGN PATENT DOCUMENTS

| | | | |
|---|---|---|---|
| CN | 106937343 A | 7/2017 | |
| EP | 3096557 A1 | 11/2016 | |
| EP | 3506680 A1 | 7/2019 | |
| WO | 2010127331 A1 | 11/2010 | |
| WO | 2011020002 A1 | 2/2011 | |
| WO | WO-2016056811 A1 * | 4/2016 | ........... B01D 53/228 |
| WO | 2018008980 A1 | 1/2018 | |

OTHER PUBLICATIONS

3GPP TS 24.008: "3rd Generation Partnerstrip Project Mobile Radio Interface Layer 3 Specification; Core Network Protocols; Stage 3 (Release 15)", V15.0.0, Sep. 30, 2017 (Sep. 30, 2017), pp. 425-426, 427, 626.
International Search Report and Written Opinion—PCT/CN2017/105341—ISA/EPO—dated Jun. 27, 2018.
International Search Report and Written Opinion—PCT/CN2018/108237—ISA/EPO—Jan. 3, 2019.
Nokia Siemens Networks, et al., 3GPP TSG-SA WG2 Meeting #89, S2-120746 Voice Continuity between E-UTRAN and UTRAN Feb. 29, 2012, 4 pages.
Supplementary Partial European Search Report—EP18866711—Search Authority—Munich—dated Oct. 19, 2021.
China Unicorn: "Support of EPS Fallback—23.501," SA WG2 Meeting #122bis, S2-175486, Aug. 21-25, 2017, (Aug. 25, 2017), Sophia Antipolis, France, 3 pages.
HTC: "Clarification to the Definition of 5G Voice Centric and 5G Data Centric UE," SA WG2 Meeting #S2-122, S2-174753, Jun. 26-30, 2017, (Jun. 30, 2017), San Jose Del Cabo, Mexico, 2 pages.
Huawei, et al., "Voice Service for the UE Camping on 5GS," SA WG2 Meeting #122 Bis, S2-175551, Aug. 21-25, 2017, (Aug. 25, 2017), Sophia Antipolis, France, 4 pages.
"3rd Generation Partnership Project, Technical Specification Group Radio Access Network, Evolved Universal Terrestrial Radio Access (E-UTRA), User Equipment (UE) procedures in idle mode (Release 16)", 3GPP TS 36.304, V16.4.0 (Jun. 2021), 64 Pages.
3GPP TS 23.272: "3rd Generation Partnership Project; Technical Specification Group Services and System Aspects; Circuit Switched (CS) Fallback in Evolved Packet System ( EPS); Stage 2 (Release 11)", 3rd Generation Partnership Project, Mobile Competence Centre, 650, Route Des Lucioles, F-06921 Sophia-Antipolis Cedex, France, vol. V11.4.0, Mar. 5, 2013, XP051673942, pp. 1-91.
QUALCOMM: "Circuit-Switched Fallback. The First Phase of Voice Evolution for Mobile LTE Devices", White Paper, Jan. 1, 2012, XP055227624, pp. 1-11.

* cited by examiner

300

Circuit-Switched Fallback

DUAL REGISTRATION

CONFIGURATION FOR LEGACY VOICE SUPPORT IN 5G

CROSS-REFERENCE TO RELATED APPLICATION(S)

This application is the U.S. national stage of PCT patent application number PCT/CN2018/108237 filed on Sep. 28, 2018 which claims priority to and benefit of PCT patent application number PCT/CN2017/105341 filed on Oct. 9, 2017, the content of each of which is incorporated herein by reference.

TECHNICAL FIELD

The technology discussed below relates generally to wireless communication systems, and more particularly, to configuring a voice domain and/or a radio access technology (RAT) for a user equipment (UE).

INTRODUCTION

When fourth generation (4G) long-term evolution (LTE) networks were deployed, they did not always include the capability to support voice over internet protocol (VOIP) services, where voice calls utilize the packet-switched (PS) network. This service is often called VoLTE, and generally relies on the core network having deployed IP multimedia subsystems (IMS). When VoLTE was not available in a network, LTE networks often utilized a circuit-switched fallback (CSFB) service to support a user equipment (UE) making a voice call. Essentially, with CSFB, a UE that is active on an LTE network uses another radio access technology (RAT) (e.g., GSM, WCDMA, CDMA2000, 1× RTT, etc.) for voice calls and any other circuit-switched services.

Voice over new radio (VoNR) is a feature of a proposed fifth generation (5G) network. Similar to 4G LTE, some time will be required before UEs and the radio access network (RAN) nodes are optimized and fully interoperable with VoNR. Currently, if a UE indicates that VoNR is not supported, then the UE disables 5G and reselects a legacy compatible alternative (e.g., 4G LTE). This prevents the UE from engaging in any communication over the 5G network. Alternatively, if the UE supports VoNR but is not optimized to handle it, the user may experience poor quality calls.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

The solutions provided herein are directed to systems and methods for configuring a voice domain and/or a radio access technology (RAT) for a user equipment (UE) in a network according to the preferences of the UE. For example, if the UE cannot support or is not optimized for 5G voice, the network may hand over (i.e., switch or fallback) to a 4G voice solution (e.g., VoLTE, circuit switched fallback, circuit switched voice) over a preferred RAT (e.g., LTE, evolved LTE, WiFi).

In one example, a method of wireless communication operable at a radio access network (RAN) node is disclosed. The method includes receiving a voice preference of a UE, determining whether the voice preference is supported by a first network to which the UE is registered, and handing over voice service to a second network that supports the voice preference of the UE while maintaining registration with the first network.

In another example, a RAN node configured for wireless communication is disclosed. The RAN node includes means for receiving a voice preference of a user equipment (UE), means for determining whether the voice preference is supported by a first network to which the UE is registered, and means for handing over voice service to a second network that supports the voice preference of the UE while maintaining registration with the first network.

In another example, a method of wireless communication operable at a node in a core network is disclosed. The method includes receiving a voice preference from a user equipment (UE), generating a RAT/frequency selection priority (RFSP) index based on the received voice preference, and communicating the RFSP index to a radio access network (RAN) node in response to a registration request from the UE.

In another example, a core network node configured for wireless communication is disclosed. For example, the core network node includes means for receiving a voice preference from a user equipment (UE), means for generating a RAT/frequency selection priority (RFSP) index based on the received voice preference, and means for communicating the RFSP index to a radio access network (RAN) node in response to a registration request from the UE. In some example, the core network node includes means for selecting a mobile origination (MO) voice domain for the UE based on the voice preference.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The present disclosure is directed to systems and methods for configuring a voice domain and/or a radio access technology (RAT) for a UE in a network according to a voice preference of the UE. For example, if the UE cannot support 5G voice, the network may deploy a 4G voice domain (e.g., VoLTE, circuit switched fallback, circuit switched voice) over a preferred RAT (e.g., LTE, eLTE, WiFi).

Wireless Communication System

Figure 1:
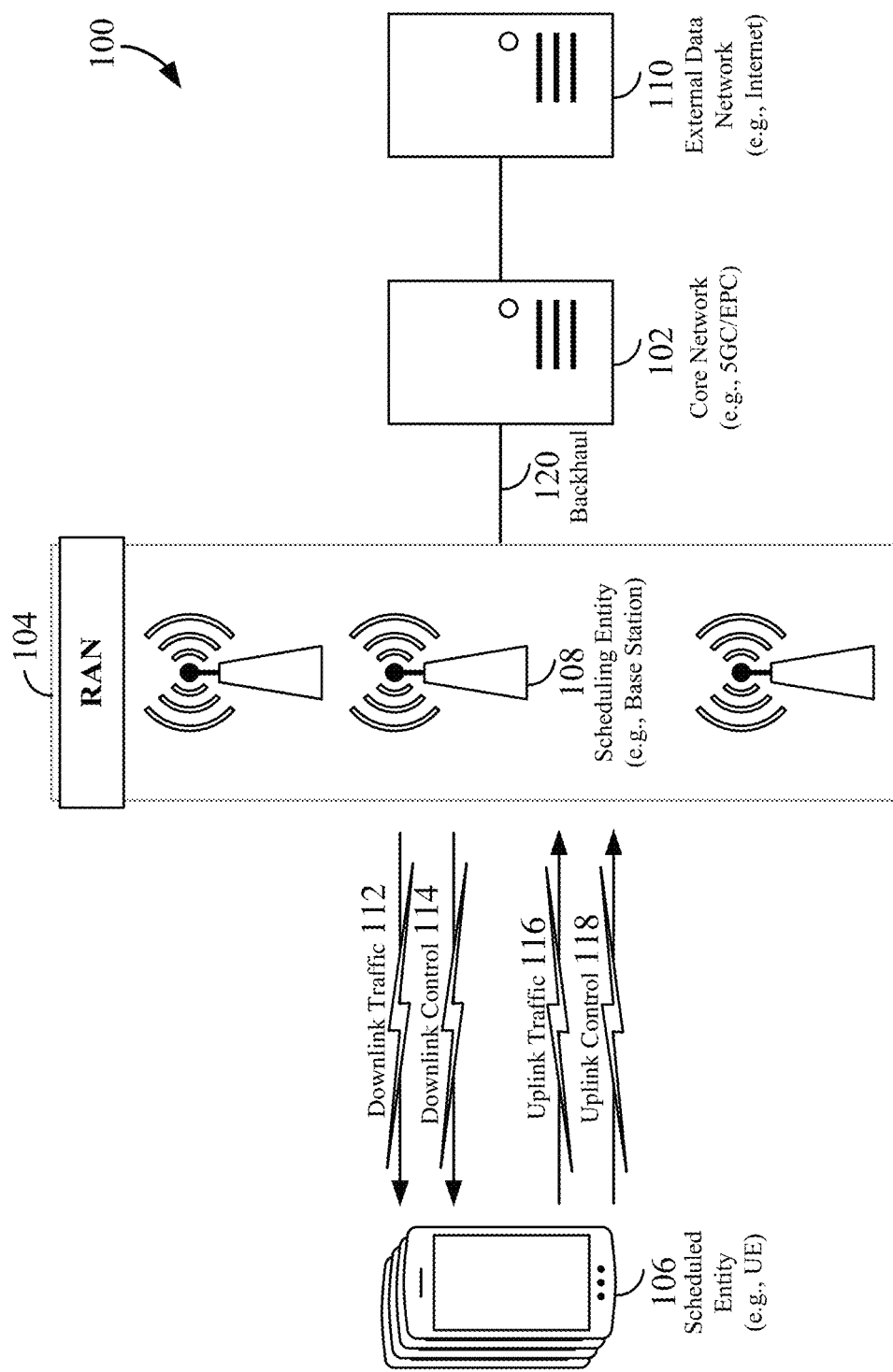
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (E-UTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
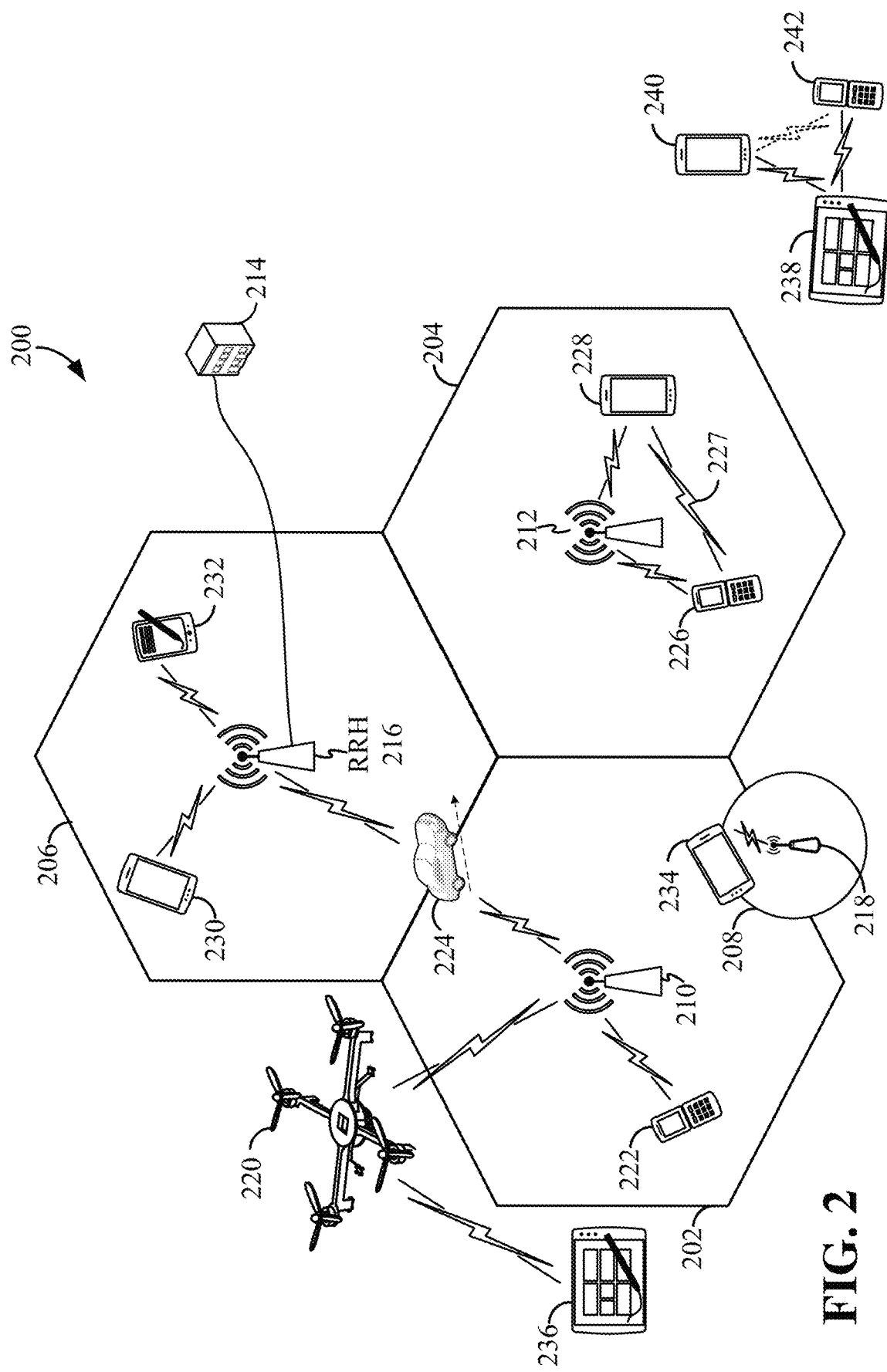
FIG. 2 is a conceptual illustration of an example of a radio access network (RAN).

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another by, for example, switching between dual registered networks, or falling back to another RAN node in a dual connectivity network). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In an LTE network, when a UE registers with the evolved packet core (EPC), default evolved packet system (EPS) bearers are established for the UE. The default EPS bearers only enable 'best effort' transport of user data, and do not guarantee a desired QoS for user application flows. To obtain VoIP services, a UE performs IMS registration with the IMS Core, and the network establishes a dedicated EPS bearer for transport of VoIP audio and IMS signaling traffic for the UE. This dedicated EPS bearer provides the desired QoS for VoIP. If IMS is not available, LTE networks may support circuit-switched (CS) voice service using circuit-switched fallback (CSFB). Essentially, a UE that is active on an LTE network uses another RAT (e.g., GSM, WCDMA, CDMA2000, 1× RTT, etc.) for voice calls and any other CS services.

Figure 3:
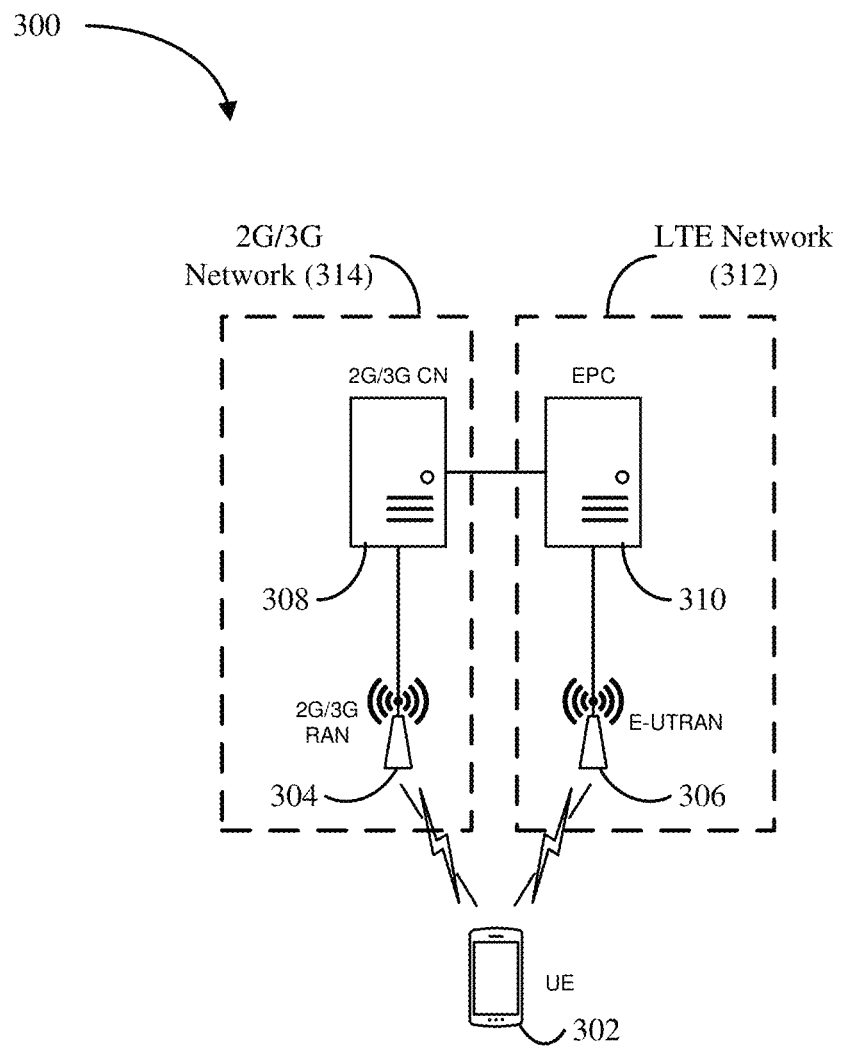
FIG. 3 is a conceptual illustration of an example of a circuit-switched fallback (CSFB) network according to some aspects of the disclosure.

FIG. 3 is a conceptual illustration of an example of a CSFB network according to some aspects of the disclosure. In this example, a UE 302 is attached to both an LTE network 312 and a 2G/3G network 314, such that the UE 302 may undergo CSFB. Here, a first base station 304 is included in a 2G/3G radio access network (RAN) having a 2G/3G core network 308, while a second base station (eNB) 306 is included in an evolved terrestrial radio access network (E-UTRAN) having an EPC 310. During the UE's 302 initial registration with the EPC 310, the UE 302 indicates its desire to perform a "combined attached," so that it may also be registered with the CS, 2G/3G network 314. When a voice call is initiated, the UE 302 is handed over or redirected to the first base station 304 so that a CS voice call can use that network. When the CS call is complete, the UE 302 is handed over or redirected back to the E-UTRAN 306. In some cases, a UE may have the capability to utilize IMS PS voice calls but may prefer to have a CSFB option available when needed. Similarly, it may be the case that a UE has only the capability to utilize either one or the other voice domain. Accordingly, LTE networks provide procedures to establish the UE capability to utilize one or the other voice domain, and further, if the UE is capable of utilizing both voice domains, the UE preference between the two.

Figure 4:
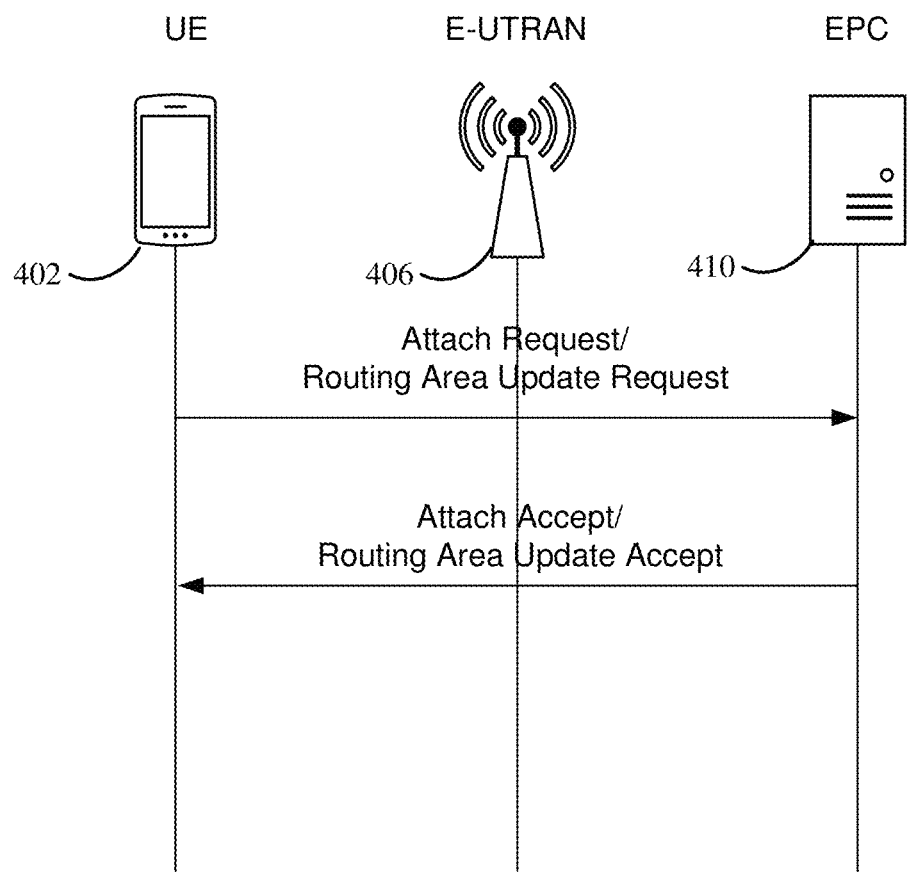
FIG. 4 is a conceptual illustration of a communication of voice domain preference between the user equipment (UE) and the evolved packet core (EPC) over evolved universal mobile telecommunications system terrestrial radio access network (E-UTRAN) according to some aspects of the disclosure.

FIG. 4 is a conceptual illustration of a communication of voice preference between the user equipment (UE) 402 and the evolved packet core (EPC) 410 over evolved universal mobile telecommunications system terrestrial radio access network (E-UTRAN) 406 according to some aspects of the disclosure. Conventionally, the UE 402 sends a non-access stratum (NAS) attach request message to the EPC 410 to request packet delivery services from the EPC 410. If the attach request message is accepted by the network, an attach accept message is sent to the UE 402. The attach accept message may include one or more information elements (IEs) describing the support of specific features, such as the types of connectivity supported. For example, the UE may indicate a voice preference to a mobile management entity (MME) of the EPC 410 using the IE 500 illustrated in FIG. 5. The voice preference may include a voice domain preference and/or a voice RAT preference. In one example, the voice domain preference may include one or more of a circuit switched (CS) voice, IP multimedia subsystem (IMS) packet-switched (PS) voice, circuit switched fallback (CSFB), or voice over new radio (VoNR). In another example, the RAT preference may include one or more of a 5G New Radio (NR) communications standard, a long-term evolution (LTE) communications standard, or an evolved LTE (eLTE) communications standard.

Figure 5:
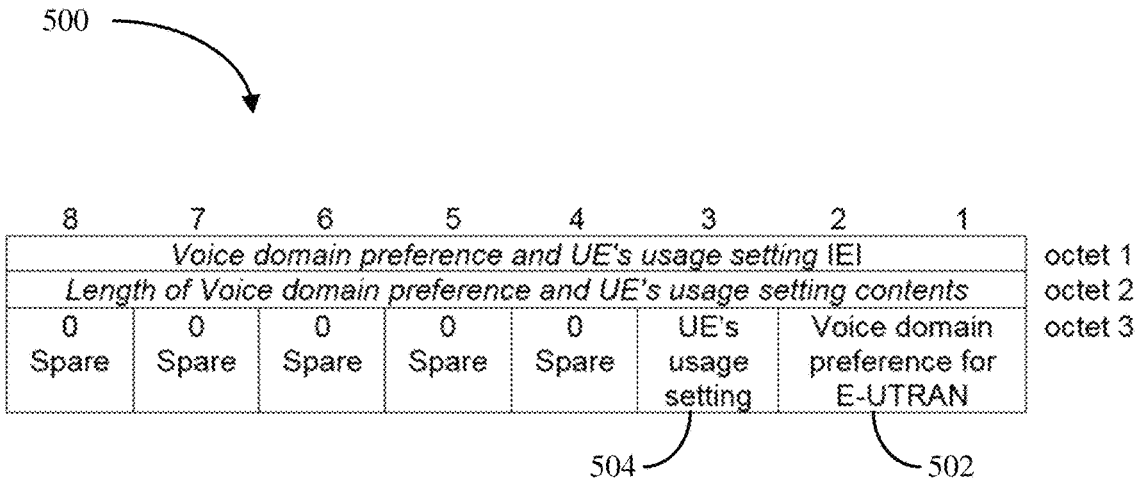
FIG. 5 is a conceptual illustration of an example information element (IE) for a UE voice domain preference and usage setting according to some aspects of the disclosure.

FIG. 5 is a conceptual illustration of an example information element (IE) 500 for indicating a UE voice domain preference for E-UTRAN 502 and a usage setting 504 according to some aspects of the disclosure. In this example, the UE's usage setting 504 is one bit that indicates whether the UE's connection will be voice-centric or data-centric. The voice domain preference for E-UTRAN field 502 may include two bits that indicate the UE's capabilities for, and preference between CS voice and IMS PS voice. As one example, four settings of the two bit field may include: "CS Voice Only"; "IMS PS Voice Only"; "CS Voice as Primary, IMS PS Voice as Secondary"; and "IMS PS Voice as Primary, CS Voice as Secondary."

In LTE networks, at certain times such as during establishment of a UE's initial connection to the network (the attach request) or during a routing area update, the UE may provide to the network a NAS protocol data unit (PDU) that can be used to determine its voice domain preference between CS voice and IMS PS voice. In the case of an attach request, within this PDU the UE provides an attach type IE, indicating whether the request is for an EPS attach, a combined EPS/IMSI attach, or an emergency attach. If the attach type is set to a combined attach, this signals to the EPC that the UE requires registration in the CS domain, and that the UE is CSFB-capable. Further, for both the attach request PDU and a routing area update PDU, the UE provides an additional update type IE, indicating whether the UE wishes for a CS connection for short message service (SMS) only, but not CSFB for voice calls. The E-UTRAN forwards the NAS PDU to the EPC, including the NAS PDU provided by the UE, among other information. In response, the voice domain preference may be configured and assigned to the UE by the home public land mobile network (HPLMN), or similar entity. For example, the EPC may send a certain NAS PDU (e.g., an attach accept or routing area update accept) to the UE to indicate whether the attach request or routing area update request, respectively, has been accepted. The NAS PDU sent to the UE may include the IE 500 described above and illustrated in FIG. 5, including the UE's usage setting and the voice domain preference for E-UTRAN.

According to certain aspects of this disclosure, the "voice domain preference for E-UTRAN" field 502 may include a voice preference relating to one or more of a UE voice domain preference and/or a RAT preference. In this example, the voice domain preference field 502 may be renamed "voice preference for 5G." For example, the voice domain preference field 502 may include voice preference information including one or more of a primary voice domain preference and a secondary voice domain preference, or a primary voice RAT preference and a secondary voice RAT preference. In some examples, the IE 500 may include voice preference information in a spare field if the voice domain preference field 502 does not have a sufficient number of bits. For example, a first IE field may include one or more of a primary voice domain preference and a secondary voice domain preference, while a second IE field may include one or more of a primary voice RAT preference and a secondary voice RAT preference.

Figure 6:
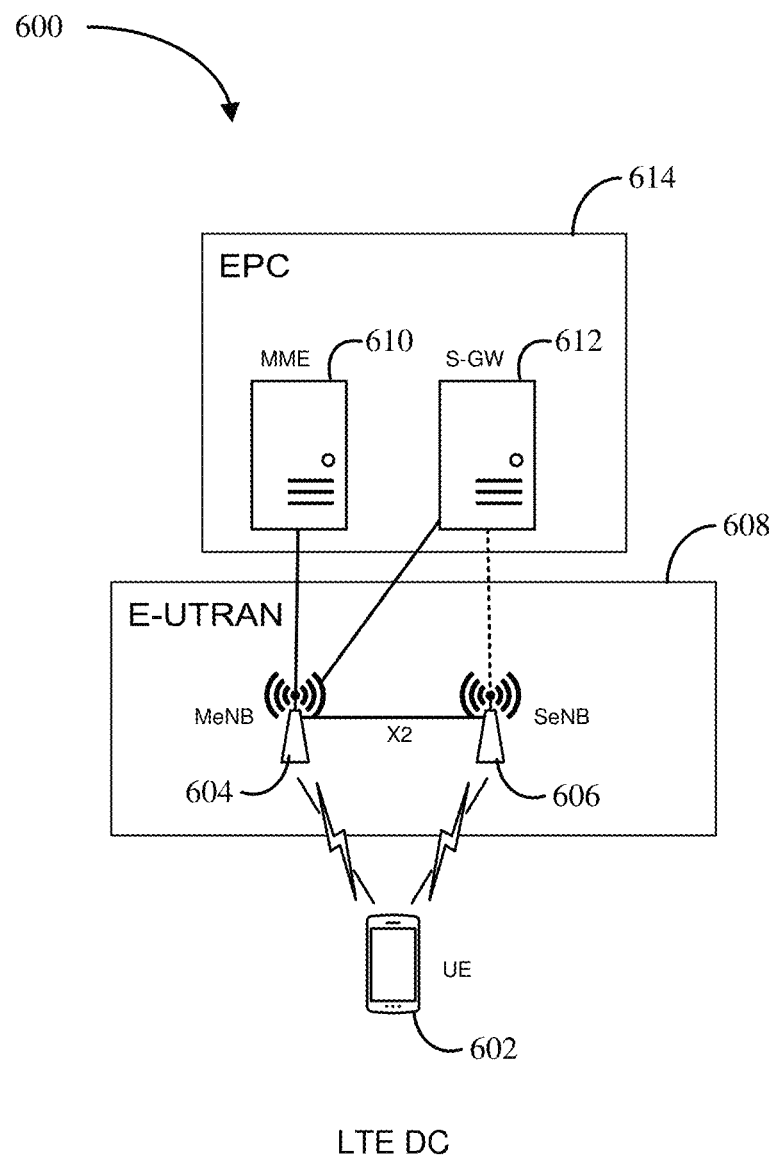
FIG. 6 is a conceptual illustration of an example fourth generation (4G) long-term evolution (LTE) network supporting dual connectivity according to some aspects of the disclosure.

FIG. 6 is a conceptual illustration of an example fourth generation (4G) long-term evolution (LTE) network 600 supporting dual connectivity (DC) according to some aspects of the disclosure. For example, the LTE network 600 includes a UE 602 in wireless communication with both a master eNB (MeNB) 604 and a slave eNB (SeNB) 606 of the E-UTRAN 608. LTE networks may support DC where a UE having the capability is configured to utilize radio resources provided by two distinct base stations (e.g., MeNB 604 and SeNB 606). This scheme is useful in a scenario where the two base stations are interconnected with a less than ideal backhaul: one example is when one of the base stations is a small cell or femtocell using a cable modem for its backhaul.

From the perspective of the UE 602 in FIG. 6, the MeNB 604 and the SeNB 606 may be interconnected using an X2 interface. The X2 interface connects neighboring base stations in a peer-to-peer fashion to assist handover and provide a means for rapid coordination of radio resources. For control signaling, only the MeNB 604 is connected to an MME 610 within the EPC 614, and any control signaling from the UE 602 to the SeNB 606 is relayed to the EPC 614 through the MeNB 604 via the X2 interface. Each of the MeNB 604 and the SeNB 606 controls the allocation of its own radio resources, although they coordinate their respective allocations using X2 interface signaling. For user data, the MeNB 604 is connected to a serving gateway (S-GW) 612. The SeNB 606 may also be connected to the S-GW 612, although in some configurations, UE user data may be relayed to the S-GW 612 through the MeNB 604 via the X2 interface.

Figure 7:
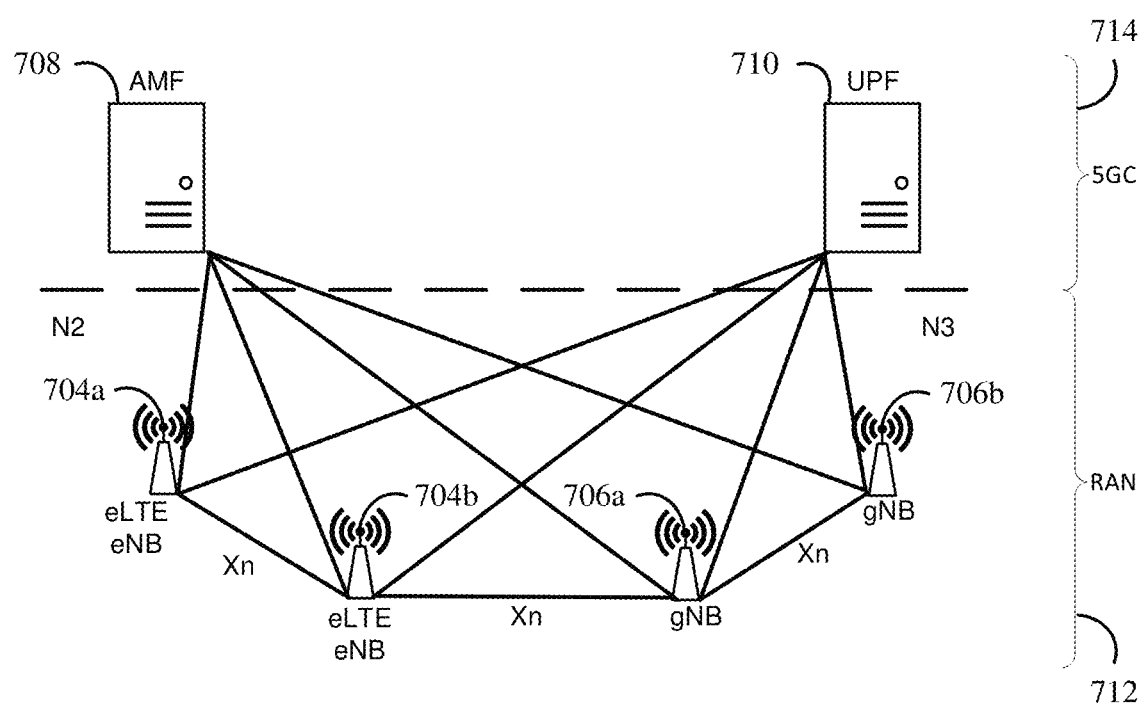
FIG. 7 is a conceptual illustration of an example RAN architecture in accordance with some aspects of the disclosure.

FIG. 7 is a conceptual illustration of an example RAN architecture in accordance with some aspects of the disclosure. FIG. 7 includes a plurality of RAN nodes, including evolved LTE (eLTE) eNBs (704a, 704b) and NR gNBs (706a, 706b). The term eLTE denotes the continued evolution of the 4G LTE that supports connectivity to EPC and 5GC. For example, references herein to next generation eNB (ng-eNB) or next generation radio access network (NG-RAN) may relate to an eNB or RAN with eLTE connectivity capabilities. The gNB is a node that can support NR and connectivity to 5GC 714. The eLTE eNBs are an evolution of the eNB that support connectivity to EPC and 5GC 714, as well as the associated RATs. Thus, the RAN 712 may support NR and a legacy RAT such as eLTE, and/or LTE. The RAN 712 nodes are communicatively coupled to an AMF 708 and a user plane function (UPF) 710. In such a configuration, a voice preference may be communicated via IE in a NAS PDU from the UE to one of the RAN 712 nodes via a control plane (N2) interface. The voice preference may include one or more of a voice domain preference or a voice RAT preference. Both the voice domain preference and the voice RAT preference may be configured to the UE by HPLMN via open mobile alliance (OMA) device management (DM) protocol. The RAT preference for voice may be carried either in the same IE used for the voice domain preference, or in a different IE. For example, a first IE may include one or more of a primary voice domain preference and a secondary voice domain preference, while a second IE may include one or more of a primary voice RAT preference and a secondary voice RAT preference.

In 5G NR, the intra-E-UTRAN DC described above is being generalized into what is being called multi-RAT dual connectivity (MR-DC). Similar to the above, in MR-DC, a UE, if it has the capability, can be configured to utilize radio resources provided by two distinct schedulers located in two different RAN nodes. However, rather than both RAN nodes being eNBs that provide E-UTRAN access, in this case, one RAN node will provide the UE with E-UTRAN access, while the other RAN node will provide the UE with NR access. There are several different deployment scenarios for MR-DC, some of which are standalone 5G networks, while others are non-standalone networks that may be a hybrid between a 5G network and an LTE network.

Figure 8:
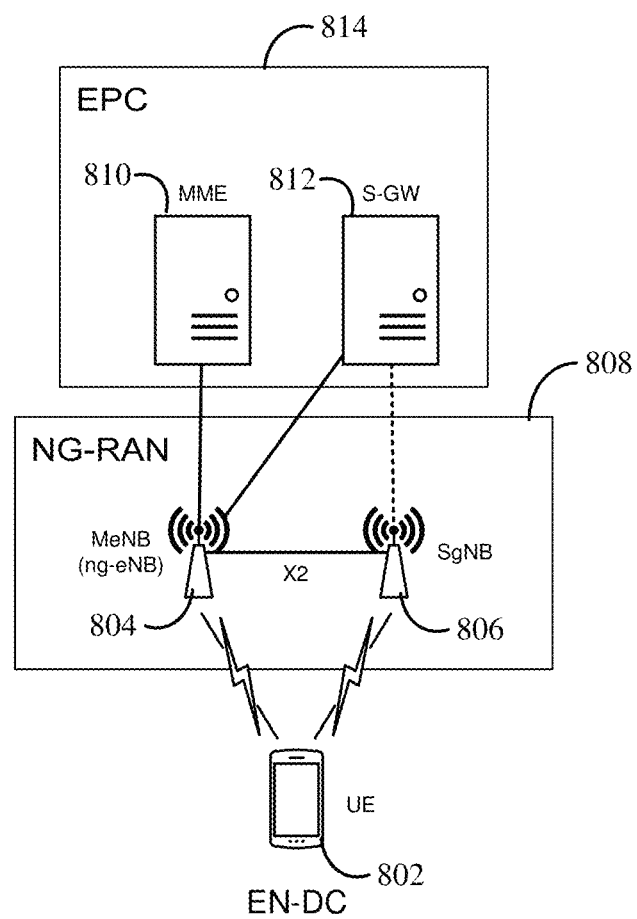
FIG. 8 is a conceptual illustration of an example EPC network configuration with dual connectivity (EN-DC) according to some aspects of the disclosure.

FIG. 8 is a conceptual illustration of an example EPC network configuration with dual connectivity (EN-DC) according to some aspects of the disclosure. Initial deployments of 5G technologies are envisioned to be complementary to existing 4G LTE networks utilizing DC. To support this deployment scenario, LTE standards for the E-UTRAN are being updated to support MR-DC via EN-DC. As such, the EN-DC architecture may be suitable for deployment scenarios that introduce 5G NR but do not introduce 5GC. In this example, a UE 802 is connected to an LTE eNB 804 that acts as a master node (MeNB), and an NR gNB 806 that acts as a slave node (SgNB). Here, to denote that the LTE eNB 804 is enhanced to support its role as MeNB, the LTE eNB 804 may be called an ng-eNB, as in "next generation." Further, the RAN that includes the LTE eNB 804 and NR gNB 806 to support such an EN-DC deployment may be called an NG-RAN 808. Within an NG-RAN 808, the ng-eNBs and gNBs are interconnected via an X2 interface. The LTE eNB 804 that acts as an MeNB is connected to the EPC 814 (i.e., the LTE core network) for both user plane and control plane signaling. However, the NR gNB 806 that acts as an SgNB may have limited connectivity to the EPC 814. For example, control plane signaling between the UE 802 and the EPC 814 over bearers established by the NR gNB 806 are relayed to the EPC 814 via the LTE eNB 804, over the X2 interface. For user data, in some examples, the NR gNB 806 may utilize a direct connection to the S-GW 812 in the EPC 814; while in other examples, the NR gNB 806 may relay the user data to the LTE eNB 804 via the X2 interface.

Figure 9:
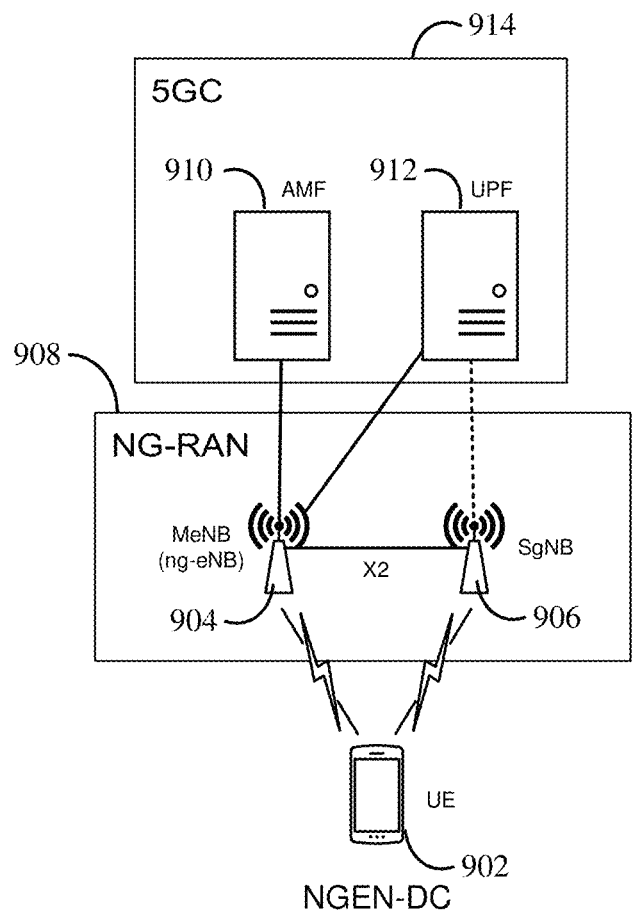
FIG. 9 is a conceptual illustration of an example next generation radio access network (NG-RAN) that supports NG-RAN E-UTRAN new radio (E-UTRAN-NR) with dual connectivity (NGEN-DC) according to some aspects of the disclosure.

FIG. 9 is a conceptual illustration of an example next generation radio access network (NG-RAN) that supports NG-RAN E-UTRAN new radio (E-UTRAN-NR) with dual connectivity (NGEN-DC) according to some aspects of the disclosure. The NGEN-DC architecture is suitable for deployment scenarios where LTE RAN have been upgraded to support 5GC. In this example, the NGEN-DC includes a configuration whereby one base station may serve as a 4G ng-eNB and another base station may serve as a 5G gNB. In this example, a UE 902 is connected to the ng-eNB 904 that acts as a master node (MeNB) and the gNB 906 that acts as a slave node (SgNB). In this scenario, the ng-eNB 904 is connected to a 5G Core Network (5GC) 914, while the gNB 906 utilizes the ng-eNB 904 to relay all control signaling via an X2 interface. The NGEN-DC architecture may be suitable for deployment scenarios where LTE RAN nodes have been upgraded to support 5GC.

Figure 10:
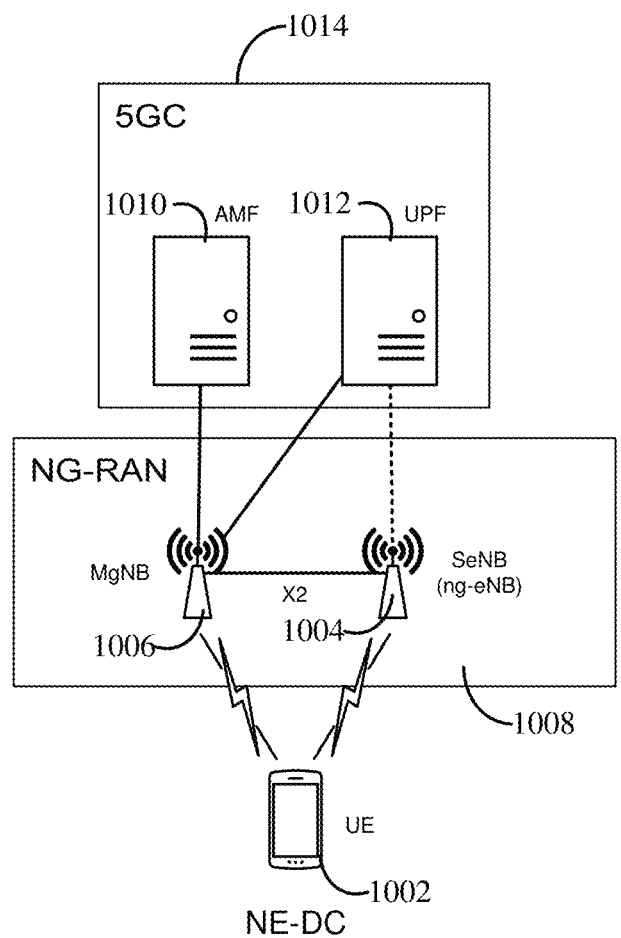
FIG. 10 is a conceptual illustration of an example NG-RAN that may support NR-E-UTRAN dual connectivity according to some aspects of the disclosure.

FIG. 10 is a conceptual illustration of an example NG-RAN 1008 that may support E-UTRAN-NR dual connectivity (DC) according to some aspects of the disclosure. The NE-DC architecture may be appropriate for deployment scenarios where 5G NR can provide continuous coverage. In this example, a UE 1102 is connected to one gNB 1006 that acts as a master node (MgNB), and one ng-eNB 1004 that acts as a slave node (SeNB). In this scenario, the gNB 1006 is connected to the 5GC 1014, while the ng-eNB 1004 utilizes the gNB 1006 to relay all control signaling. That is, as above, the gNBs 1006 and ng-eNBs 1004 in the NG-RAN 1008 are interconnected via an X2 interface.

Figure 11:
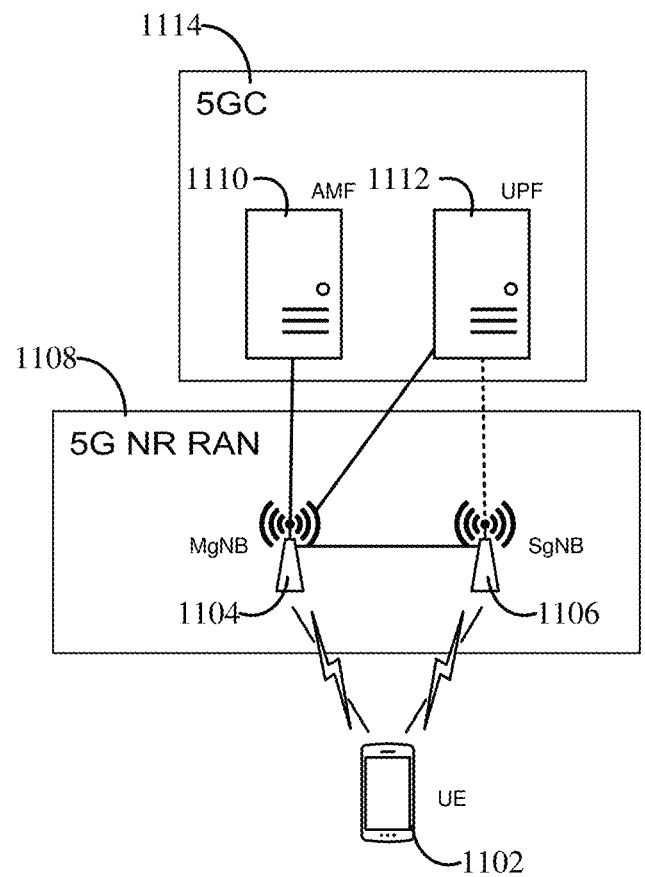
FIG. 11 is a conceptual illustration of an example 5G NR-RAN that supports 5G with dual connectivity (5G-DC) according to some aspects of the disclosure.

FIG. 11 is a conceptual illustration of an example 5G NR-RAN 1108 that supports 5G with dual connectivity (5G-DC) according to some aspects of the disclosure. In 5G-DC, a UE 1102 is connected to a first gNB that acts as a master node (MgNB) 1104, and a second gNB that acts as a slave node (SgNB) 1106. In this scenario, the MgNB 1104 is connected to the 5GC 1114, while the SgNB 1106 utilizes the MgNB 1104 to relay all control signaling. That is, the base stations in the 5G NR-RAN 1108 are interconnected via an X2 interface.

Figure 12:
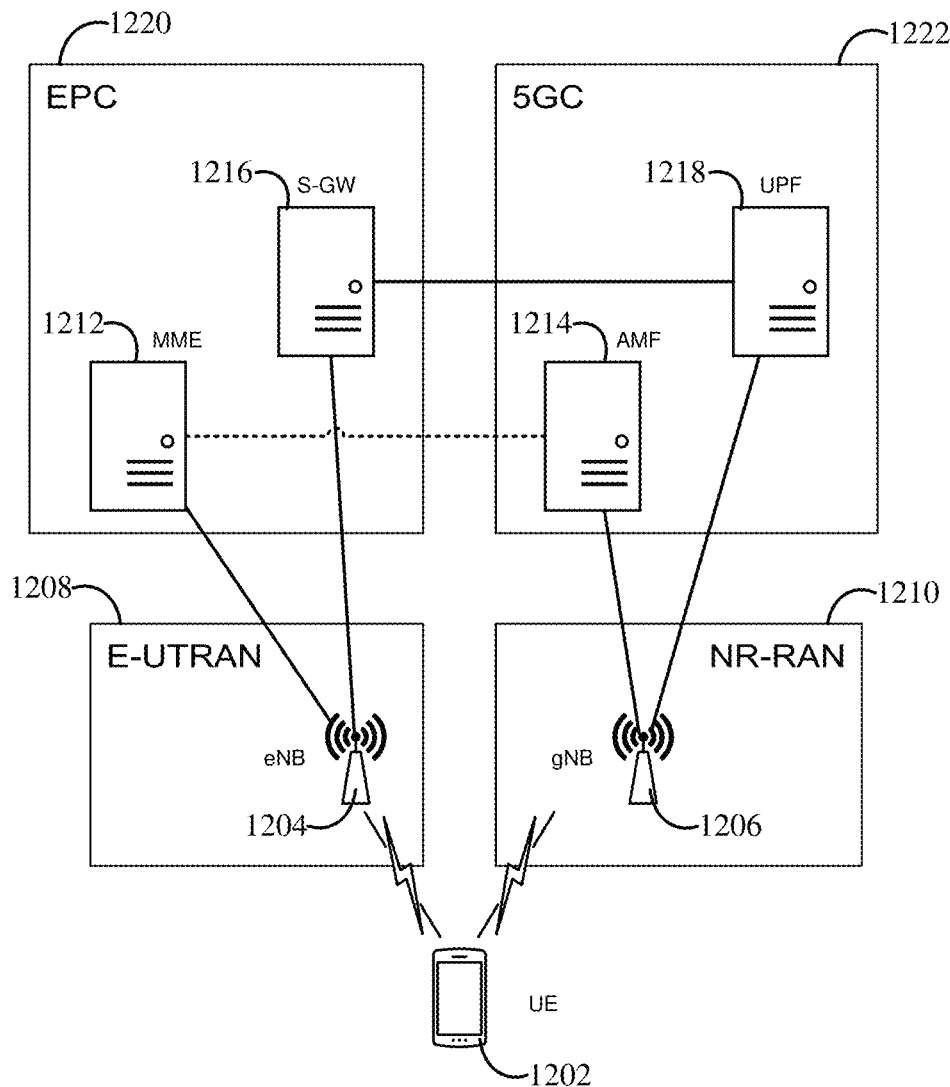
FIG. 12 is a conceptual illustration of a UE having dual registration with 5G and LTE networks according to some aspects of the disclosure.

FIG. 12 is a conceptual illustration of a UE 1202 having dual registration with 5G and legacy networks according to some aspects of the disclosure. With dual-registration, the UE 1202 can handle independent registrations for 5GC and EPC, being registered to 5GC only, EPC only, or to both 5GC and EPC. In some deployment scenarios, even with co-located or overlapping deployment areas, eNB 1204 and gNB 1206 may not be interconnected with the X2 interface. In this scenario, the UE 1202 may support dual registration, having independent radio connectivity with the E-UTRAN 1208 and the NR-RAN 1210. With dual registration, the UE may connect to the 5G NR network via the NR-RAN 1210, or it may connect to the LTE network via the E-UTRAN 1208.

Voice Domain Preference

In the early stages of 5G deployment, certain UEs 1202 and RAN networks may not support or be fully optimized for voice over new radio (VoNR) services (e.g., packet-switched (PS) voice services), or voice over 5G. Although 3GPP has not yet defined protocols for CS voice or CSFB for 5G networks, the UE 1202 may still have support for CS voice calls by taking advantage of dual registration and providing an indication of voice domain preference. This provides the advantage of allowing a UE 1202 that may not be capable of PS voice communication over 5G, or may not be optimized for such communication, the opportunity for handing over voice services (i.e., switching voice service from the 5G network to a legacy network while maintaining non-voice services at the 5G network, or falling back to a RAN node of the same network that supports legacy voice services). This advantage provides for relatively higher quality voice services despite the lack of capability in a UE 1202.

In one example, the voice domain preference may be configured to the UE 1202 and/or base stations 1204, 1206 by the home public land mobile network (HPLMN) via open mobile alliance (OMA) device management (DM) protocol and may be indicative of the voice capabilities of the UE 1202. The voice domain preference may include VoNR domain operable over 5G, including voice over packet-switched (VoPS) and 5G VoLTE, and/or voice domain preferences that may be operable over 5G but are supported by legacy RATs may include 2G/3G/4G voice, VoLTE, CSFB, and CS voice. The voice domain preference may include a primary voice domain, or a primary voice domain along with one or more secondary or fallback voice domains. For example, the voice domain preference may include one of the following: (i) a primary 5G preference with a legacy secondary, (ii) a primary legacy preference with a 5G secondary, (iii) a sole 5G preference, or (iv) a sole legacy preference.

Once configured, the UE 1202 may communicate the voice domain preference to the base station 1204, 1206 and/or the 5GC 1222 using an information element (IE) via a radio resource control (RRC) protocol message or a non-access stratum (NAS) attach request message. In one example, the UE 1202 may communicate the voice domain preference to the base station 1204, 1206 via an N2 interface. The UE 1202 may include the voice domain preference in the UE usage setting 504 field or the voice domain preference for E-UTRAN 502 field of the IE. In this example, the "voice domain preference for E-UTRAN" 502 field of the IE may be renamed to "voice domain preference" or "voice domain preference for 5G." In another example, the UE 1202 may include the voice domain preference in a spare field of the IE.

Using dual registration, the UE 1202 may handle independent registrations for both of 5GC 1222 and EPC 1220, allowing the UE 1202 to remain in 5G for non-voice services while utilizing the EPC 1220 network for non-NR voice services. In one example, the UE 1202 may initiate the dual registration based on its voice domain preference. In another example, the 5GC 1222 or the base station 1206 may initiate the dual registration after receiving the voice domain preference.

In one example, the UE 1202 may indicate that VoNR is the voice domain preference; however, the VoNR capability of the UE 1202 may not be optimized. In this scenario, voice quality may be impacted, or may degrade during a call. Non-optimization of the voice service may be indicated by a determination that one or more quality of service (QoS) requirements of the voice service are not met. This may be followed by a fallback or switch to a legacy voice domain such as 4G/LTE voice to restore the quality of the voice service. In one example, the UE 1202 may determine that one or more QoS requirements of a call using VoNR are not being met. Throughout this disclosure, a determination of whether one or more QoS requirement are being met may include a determination based on one or more quality parameters of the voice service not being met. In another example, the determination may be based on a continued deterioration or reduction of quality over the course of the call, which may trigger a fallback or switch to a legacy domain prior to one or more of the QoS requirements of the voice service not being met. The UE 1202 may notify the 5GC 1222 that the one or more QoS requirements are not being met, and may fallback or switch to the legacy voice domain in order to improve the quality of the call.

Alternatively, the 5GC 1222 or the gNB 1206 may determine that a QoS requirement with regard to the voice service is not being met, and may initiate a switch or fallback to the legacy voice domain In this example, the 5GC 1222 may request a session modification from the EPC 1220 and a fall back of voice service from the gNB 1206 to the eNB 1204. The 5GC 1222 may request a voice service switch to the legacy voice domain with the EPC 1220 so that the UE 1202 maintains dual registration to the 5GC and the EPC. In this example, the UE 1202 may remain registered to the 5GC 1222 for non-voice services. The UE 1202 may indicate its preferred legacy voice service by providing a secondary voice domain preference in an IE. Although the UE 1202 may provide a secondary voice domain preference, voice fallback may also default to any legacy voice domain provided by EPC 1220 if no secondary preference is provided.

In another example, the UE 1202 may indicate that a legacy domain is the primary voice domain preference. If the legacy voice domain preference is not supported by the 5GC 1222, the UE 1202 may switch or fallback to EPC 1220 for voice services that correspond to the legacy domain preference upon initiation of a voice service. For example, upon connection establishment, initiation, and/or reception of a voice call, the UE 1202 may switch from the 5GC 1222 to the EPC 1220 in order to utilize the legacy voice domain preference. As used throughout this disclosure, the initiation of voice services may refer to connection establishment, initiation, and/or reception of a voice call, where the switching may occur at any suitable phase of a mobile terminated (MT) call and/or a mobile originated (MO) call. In another example, the 5GC 1222 may initiate a switch from the 5GC 1222 to the EPC 1220 in order to utilize the legacy voice domain preference.

Voice Rat Preference

In addition to a preference for a given voice domain, further aspects of the present disclosure provide for an indication of a UE 1202 preference for a given RAT. A home public land mobile network (HPLMN), or similar entity, may determine and configure a RAT preference for voice service on the UE 1202 via open mobile alliance (OMA) device management (DM) protocol. The RAT preference may be indicative of the voice capabilities of the UE 1202. The determination of the RAT preference for voice service can be based on the UE 1202 capabilities and/or the capabilities of available networks, and/or available RAN nodes. Preferred RATs for voice service may include, but are not limited to: 3G/4G/5G, LTE, eLTE, NR, GSM, WCDMA, CDMA2000, 1× RTT, WiFi, Bluetooth, etc.

The UE 1202 may communicate the RAT preference for voice services to a network via an IE. In one example, the RAT preference for voice services may be included in the same IE as the voice domain preference. The IE may be communicated to the 5GC 1222 or EPC 1220 via NAS registration request message, and/or via a radio resource control (RRC) protocol message. Similarly, the UE 1202 may provide the RAT preference for voice services to a base station 1204/1206 via N2 interface. The RAT preference may include a preferred RAT, or a preferred primary RAT along with one or more secondary RATs. This provides the advantage of allowing a UE 1202 that may not be capable voice communication over 5G, or may not be optimized for such communication, the opportunity to handover (i.e., switch voice service from the 5G network to a legacy network while maintaining non-voice services at the 5G network, or fallback to a RAN node of the same network that supports legacy voice services) to a legacy-capable RAT for voice service, while maintaining registration with the 5G network and utilizing the 5G network for non-voice services. This advantage provides for relatively higher quality voice services despite the lack of capability in a UE 1202.

In one example, the UE 1202 may be configured with a RAT preference for 5G. In this example, voice service may be supported using voice over new ratio (VoNR) (e.g., voice over packet-switched (VoPS)). However, the RAT may switch from 5G to a legacy RAT if the QoS requirements of the call cannot be maintained. For example, if a call is initiated using a 5G RAT preference, and the condition of the voice service channel deteriorates over the course of the call, then the UE 1202 may determine to fall back or switch to 4G/LTE for voice services in order to restore call quality. The fallback or switch may be triggered by a determination that one or more QoS requirement of the voice service are not being met. The switch from the 5GC 1222 to the EPC 1220 may be based on a secondary RAT preference of the UE 1202. Alternatively, a fallback may default to a legacy RAT provided by a hybrid, multi-RAT dual-connectivity (MR-DC) network. In one example, the 5GC 1222 may determine that one or more QoS requirements for VoNR are not being met, and may determine to fall back or switch to a legacy RAT based on the secondary RAT preference of the UE 1202 or the UE's 1202 dual-connectivity.

In another example, the UE 1202 may be configured with a RAT preference for a legacy RAT such as 4G/LTE. In this example, voice service may be supported using voice over LTE (VoLTE). Upon initiation of voice service, the UE 1202 may automatically switch or fall back to a legacy RAT for a call.

In another example, the 5GC may use the RAT preference of a UE 1202 for mobile terminated (MT) domain selection. For example, when the UE 1202 sends a control plane request for MT services (e.g., MT SMS) the request may be routed via the UE's RAT preference (e.g., the EPC 1220 or the 5GC 1222).

Note that dual registration is not required for voice service fallback. That is, a fallback to a legacy RAT voice service may take place in any of the multi-RAT dual connectivity deployment scenarios described above.

In a further aspect of the present disclosure, the 5GC 1222 may generate a RAT/frequency selection priority (RFSP) index for the UE 1202 based on the UE's 1202 voice domain preference and/or the RAT preference for voice service. For example, the UE 1202 may provide the voice domain preference and/or the RAT preference for voice services to the AMF 1214 so that the 5GC 1222 can configure voice services of the UE 1202 accordingly. The AMF 1214 may generate a corresponding RFSP index based on the voice domain preference and/or the RAT preference to prioritize voice services for the UE 1202. For example, if VoNR is not supported by the UE 1202, then the RAT preference (e.g., 4G/LTE) and/or voice domain preference (e.g., CS voice) may be given higher priority than NR and other RATs or voice domains. Thus, any time the UE 1202 initiates or moves into a new network, the AMF may provide the RFSP index to the new network RAN, giving priority to the UE 1202 preference(s) in the new network.

5GC NR RAN Architecture

Figure 13:
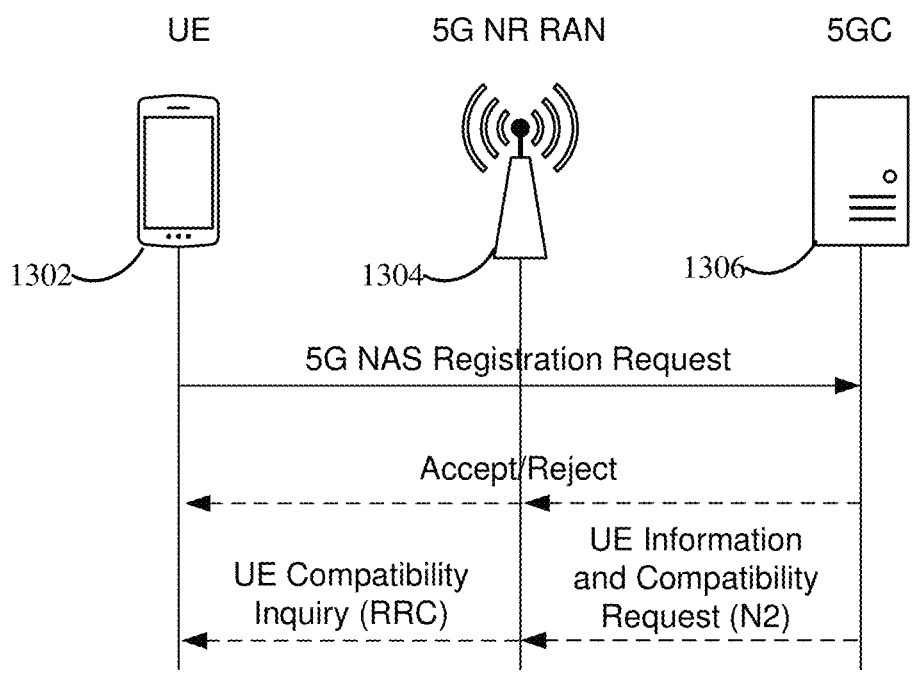
FIG. 13 is a conceptual illustration of a communication of voice domain preference and/or a radio access technology (RAT) preference between the UE and the 5G core network (5GC) over 5G NR RAN in accordance with some aspects of the present disclosure.

FIG. 13 is a conceptual illustration of a communication of voice domain preference and/or a RAT preference between the UE 1302 and the 5G core network (5GC) 1306 via a base station, or 5G NR RAN node 1304 in accordance with some aspects of the present disclosure. The UE 1302 may communicate a voice domain preference and/or the RAT preference to the 5GC 1306. The preferences may be communicated via a NAS PDU or any other suitable medium. The RAN node 1304 may forward the NAS PDU to the 5GC 1306. In response, the 5GC 1306 may send a NAS accept or reject message, or the 5GC 1306 may send a request for UE 1302 information and compatibility to the RAN node 1304 to acquire additional information regarding the UE 1302. In this example, the 5GC 1306 may send UE 1302 and/or RAN node 1304 information and compatibility request message to the RAN node 1304. This request may be transmitted standalone or included during N2 interface activation. In one example, the RAN node 1304 may deliver the UE's 1302 RAT preference and/or voice domain preference to the 5GC 1306 in response to the request.

UE/RAN Node

Figure 14:
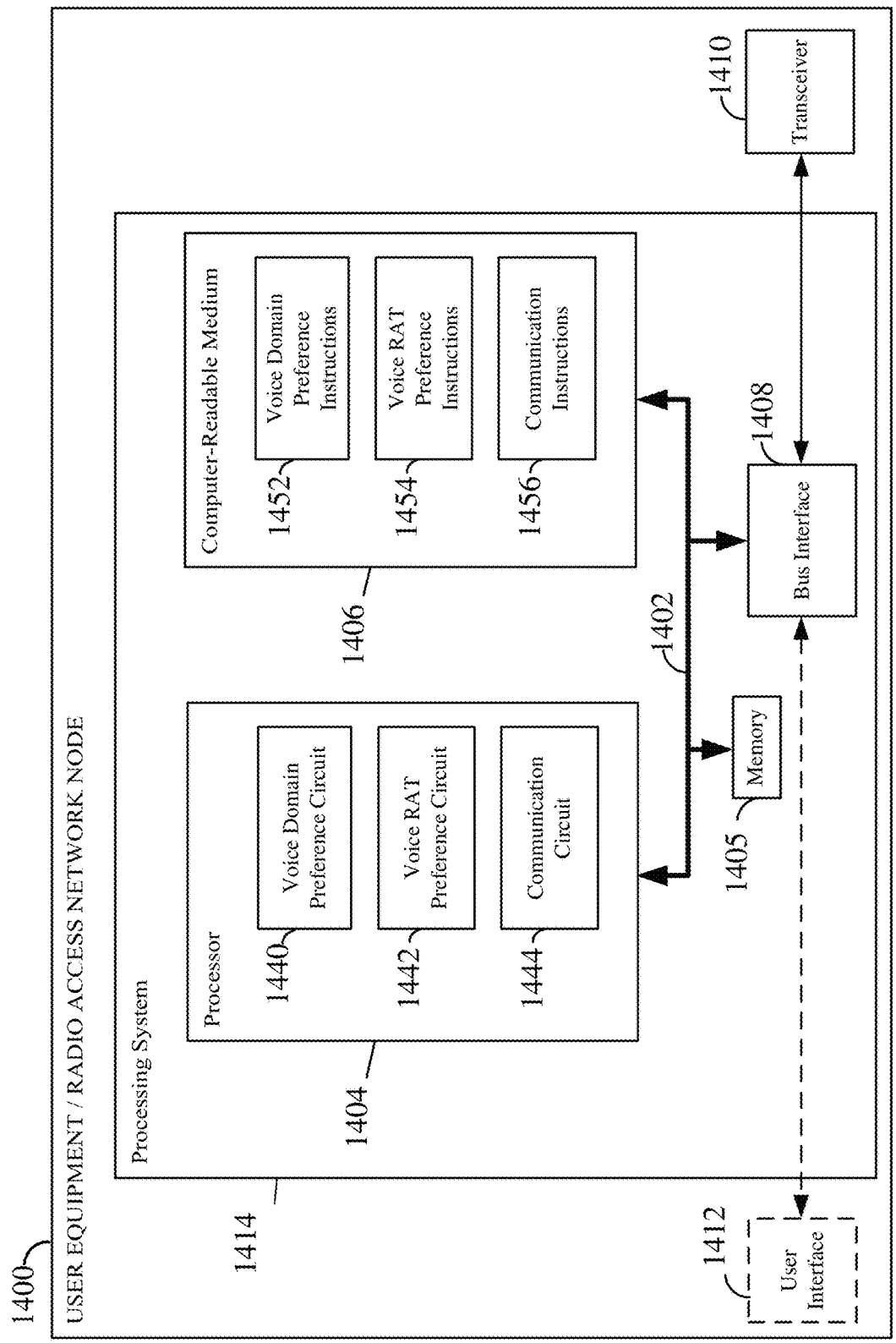
FIG. 14 is a block diagram conceptually illustrating an example of a hardware implementation for a UE or a RAN node according to some aspects of the present disclosure.

FIG. 14 is a block diagram conceptually illustrating an example of a hardware implementation for a UE or a RAN node employing a processing system 1414 according to some aspects of the present disclosure. For example, the UE/RAN node 1400 may be a UE as illustrated in any one or more of FIGS. 1-5, 7, and/or 9-14. In another example, the UE/RAN node 1400 may be a base station such as an eNB or gNB as illustrated in any one or more of FIGS. 1-5 and/or 7-14.

The UE/RAN node 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE/RAN node 1400 may be configured to perform any one or more of the functions described herein. That is, the processor 1404, as utilized in a UE/RAN node 1400, may be used to implement any one or more of the processes and procedures described below and illustrated in FIG. 16.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. Depending upon the nature of the apparatus, a user interface 1412 (e.g., keypad, display, speaker, microphone, joystick) may also be provided.

In some aspects of the disclosure, the processor 1404 may include voice domain preference circuitry 1440 configured for various functions, including, for example, determining and generating a communication that indicates the voice domain preferences of the UE/RAN node 1400, configured to be received by the 5GC or EPC. In one example, the communication may include an information element (IE) in a NAS PDU, or any other suitable communication data structure. The voice domain preference circuitry 1440 may also support receipt and configuration of the voice domain preference of the UE/RAN node 1400 by another entity, such as the HPLMN. In another example, the voice domain preference circuitry 1440 may determine whether the voice domain preference is supported by a first network (e.g., 5GC) to which the UE/RAN node 1400 is registered or if the voice domain preference is supported by a different network (e.g., EPC). In the event that the voice domain preference is supported by a different network, the voice domain preference circuitry 1440 may support registering with the different network and maintaining registration with the first network to achieve dual-registration with a first network and a second network. Stated differently, the voice domain preference circuitry 1440 may support switching a voice service rom a first network to a second network that supports the voice domain preferences of the UE/RAN node 1400.

In another example, the voice domain preference circuitry 1440 may be configured to support voice domain switching from a first network to another network during an ongoing call if one or more QoS requirements of the voice service are not satisfied. In some aspects of the disclosure, the voice domain preference circuitry 1440 may make the determination of whether the QoS requirement of the voice service are satisfied. This determination may indicate that the UE/RAN node 1400 cannot maintain a QoS parameter of the voice service or voice service channel. In another example, the voice domain preference circuitry 1440 may be configured to support voice domain switching from a first network to another network (e.g., handover from 5GC to EPC) upon call initiation or call receipt if the voice domain preference is not supported by the first network. The voice domain preference circuitry 1440 may operate in coordination with voice preference software 1452. In one example, the voice domain preference circuitry 1440 may be configured to implement one or more of the functions described below in relation to FIG. 16.

In some aspects of the disclosure, the processor 1404 may include voice RAT preference circuitry 1442 configured for various functions, including, for example, receipt and configuration of the RAT domain preference of the UE/RAN node 1400 by another entity, such as the HPLMN. The voice RAT preference circuitry 1442 may support communication of the voice RAT preference to the 5GC or EPC (i.e., core network). In another example, the voice RAT preference circuitry 1442 may be configured to provide RAT preferences for voice service to the core network via an IE.

In another example, the voice RAT preference circuitry 1442 may be configured to support RAT switching or fallback from a NR RAT to a another RAT (e.g., LTE, eLTE, WiFi, etc.) upon call initiation or receipt of a call. For example, the UE/RAN node 1400 may have dual registration to both a 5G RAT and a 4G/LTE RAT, wherein the 4G LTE RAT is the voice RAT preference. Upon receipt of a call, the voice RAT preference circuitry 1442 may determine to fallback or switch to the preferred RAT (in this example, 4G/LTE) for voice service. If the voice RAT preference is 5G NR, the voice RAT preference circuitry 1442 may support a call using VoNR. The voice RAT preference circuitry 1442 may determine to switch to a backup RAT (i.e., a second RAT) to restore voice quality. The voice RAT preference circuitry 1442 may determine that a QoS requirement of the voice channel is not satisfied during an ongoing call, which may prompt the voice RAT preference circuitry 1442 to initiate the switch or fallback so that voice service is maintained and improved during the call. The voice RAT preference circuitry 1442 may operate in coordination with voice RAT preference software 1454. The voice RAT preference circuitry 1442 may be configured to implement one or more of the functions described below in relation to FIG. 16.

The processor 1404 may further include communication circuitry 1444. The communication circuitry 1444 may include one or more hardware components that provide the physical structure that performs various processes related to wireless communication (e.g., signal reception and/or signal transmission) as described herein. The communication circuitry 1444 may operate in coordination with the communication software 1456. In one example, the communication circuitry 1444 may transmit and receive the voice domain preference and the voice RAT preference via IE, or any other suitable means. In another example, if one or more QoS requirement are not being met, the UE/RAN node 1400 may communicate this information to the 5GC to initiate a switch or fallback to another RAT for voice services. In another example, the communication circuitry 1444 may support dual-registration by providing a means for utilizing a first network for non-voice services while also utilizing a second network for voice services.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the memory 1405 may be utilized to store and provide any of the data transmitted/received by the UE/RAN node 1400 and used/generated by the voice domain preference circuit 1440, the voice RAT preference circuit 1442, and the communication circuit 1444.

One or more processors 1404 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

MME/AMF

Figure 15:
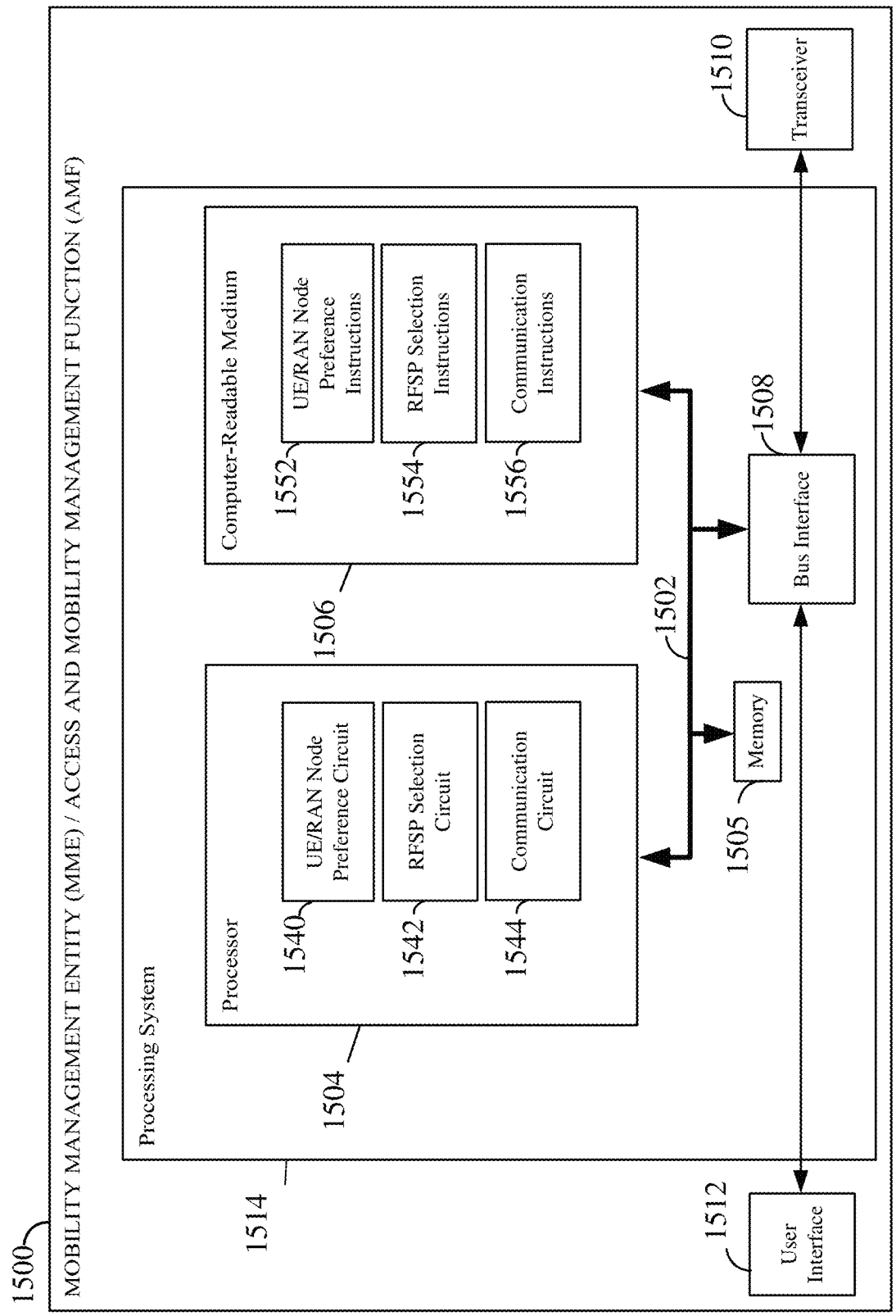
FIG. 15 is a block diagram conceptually illustrating an example of a hardware implementation for a core network node such as mobile management entity (MME) or an access management function (AMF) node according to some aspects of the present disclosure.

FIG. 15 is a conceptual diagram illustrating an example of a hardware implementation for an exemplary MME/AMF 1500 employing a processing system 1514. In accordance with various aspects of the disclosure, an element, or any portion of an element, or any combination of elements may be implemented with a processing system 1514 that includes one or more processors 1504. For example, the MME may be part of an EPC as illustrated in any one or more of FIGS. 1, 3, 4, 6, 8, and 12. The AMF may be part of a 5GC as illustrated in any one or more of FIGS. 1, 7, and 9-13.

The processing system 1514 may be substantially the same as the processing system 1514 illustrated in FIG. 15, including a bus interface 1508, a bus 1502, memory 1505, a processor 1504, and a computer-readable medium 1506. Furthermore, the MME/AMF 1500 may include a user interface 1512 and a transceiver 1510 substantially similar to those described above in FIG. 14. That is, the processor 1504, as utilized in an MME/AMF 1500, may be used to implement any one or more of the processes described below and illustrated in FIGS. 16 and 17.

In some aspects of the disclosure, the processor 1504 may include UE/RAN node preference circuitry 1540 configured for various functions, including, for example, determining and implementing a voice preference (e.g., voice domain and/or a RAT preference) of a UE/RAN node. In this example, the MME/AMF 1500 may receive a voice domain preference and/or RAT preference for voice service from the UE/RAN node via an information element (IE) in a NAS PDU, or any other suitable data structure. In a dual registration scenario, the UE/RAN node preference circuitry 1540 may initiate a voice domain and/or RAT switch from a first network to a second network. In a hybrid dual connectivity scenario, the UE/RAN node preference circuitry 1540 may initiate a voice domain and/or RAT fallback from a first network (e.g., NR RAN node) to a second network (e.g., RAN node with E-UTRAN access).

In another example, the UE/RAN node preference circuitry 1540 may determine whether the received voice domain preference and/or RAT preference for voice service are supported by a first network to which the UE/RAN node is registered or if one or more of the preferences are supported by a different network. In the event that one or more of the preferences are supported by a different network, the UE/RAN node preference circuitry 1540 may support registering the UE/RAN node with the different network in dual registration. In dual registration, the UE/RAN node preference circuitry 1540 may support switching voice service from a first network to the different network while maintaining registration with the first network and utilizing the first network for non-voice services at the first network.

In another example, the UE/RAN node preference circuitry 1540 may determine whether one or more QoS requirements of a voice service are being met. This determination may indicate that one or more of the MME/AMF 1500 or the UE/RAN node cannot maintain a QoS parameter of the voice service or voice service channel using a particular RAT and/or voice domain If the voice condition is satisfied, the UE/RAN node preference circuitry 1540 may support voice service fallback and/or switching from the first network to another network during an ongoing call to restore voice quality and maintain the ongoing call. In another example, the UE/RAN node preference circuitry 1540 may be configured to support voice domain handover from the first network to another network (e.g., handover from 5GC to EPC) upon call initiation or call receipt if the voice domain preference and/or RAT preference does not correspond to the first network.

Thus, in some aspects of the disclosure, the UE/RAN node preference circuitry 1540 may be configured for various functions, including, for example, enabling operation of voice over LTE or eLTE while maintaining 5GC non-voice services at the UE/RAN node. In this example, the UE/RAN node preference circuitry 1540 may be configured to handover an ongoing VoNR voice domain to a secondary voice domain (e.g., CS voice, etc.). The UE/RAN node preference circuitry 1540 may operate in coordination with UE/RAN node preference software 1552. For example, the UE/RAN node preference circuitry 1540 may be configured to implement one or more of the functions described below in relation to FIGS. 16 and 17.

In some aspects of the disclosure, the processor 1504 may include RFSP selection circuitry 1542 configured for various functions, including, for example, configuring an RFSP index for the UE/RAN node based on a voice domain preference and/or a RAT preference received from the UE/RAN node. For example, the MME/AMF 1500 may receive the voice domain preference and/or the RAT preference for voice services from the UE/RAN node. In response, the UE/RAN node preference circuit 1540 can configure voice services of the UE/RAN node according to the preference(s). The RFSP selection circuitry 1542 may also generate a corresponding RFSP index based on the voice domain preference and/or the RAT preference to prioritize voice services for the UE/RAN node. For example, if VoNR is not supported by the UE/RAN node, a voice domain preference (e.g., CS voice) and/or a RAT preference (e.g., 4G/LTE) may be given higher priority than NR. The RFSP selection circuitry 1542 may further operate in coordination with RFSP selection software 1554. For example, the RFSP selection circuitry 1542 may be configured to implement one or more of the functions described below in relation to FIG. 17.

The processor 1504 may further include communication circuitry 1544. The communication circuitry 1544 may include one or more hardware components that provide the physical structure that performs various processes related to wireless communication (e.g., signal reception and/or signal transmission) as described herein. The communication circuitry 1544 may further operate in coordination with the communication software 1556. In one example, the communication circuitry 1544 may receive the voice domain preference and the voice RAT preference via IE, or any other suitable means, from the UE/RAN node.

Figure 16:
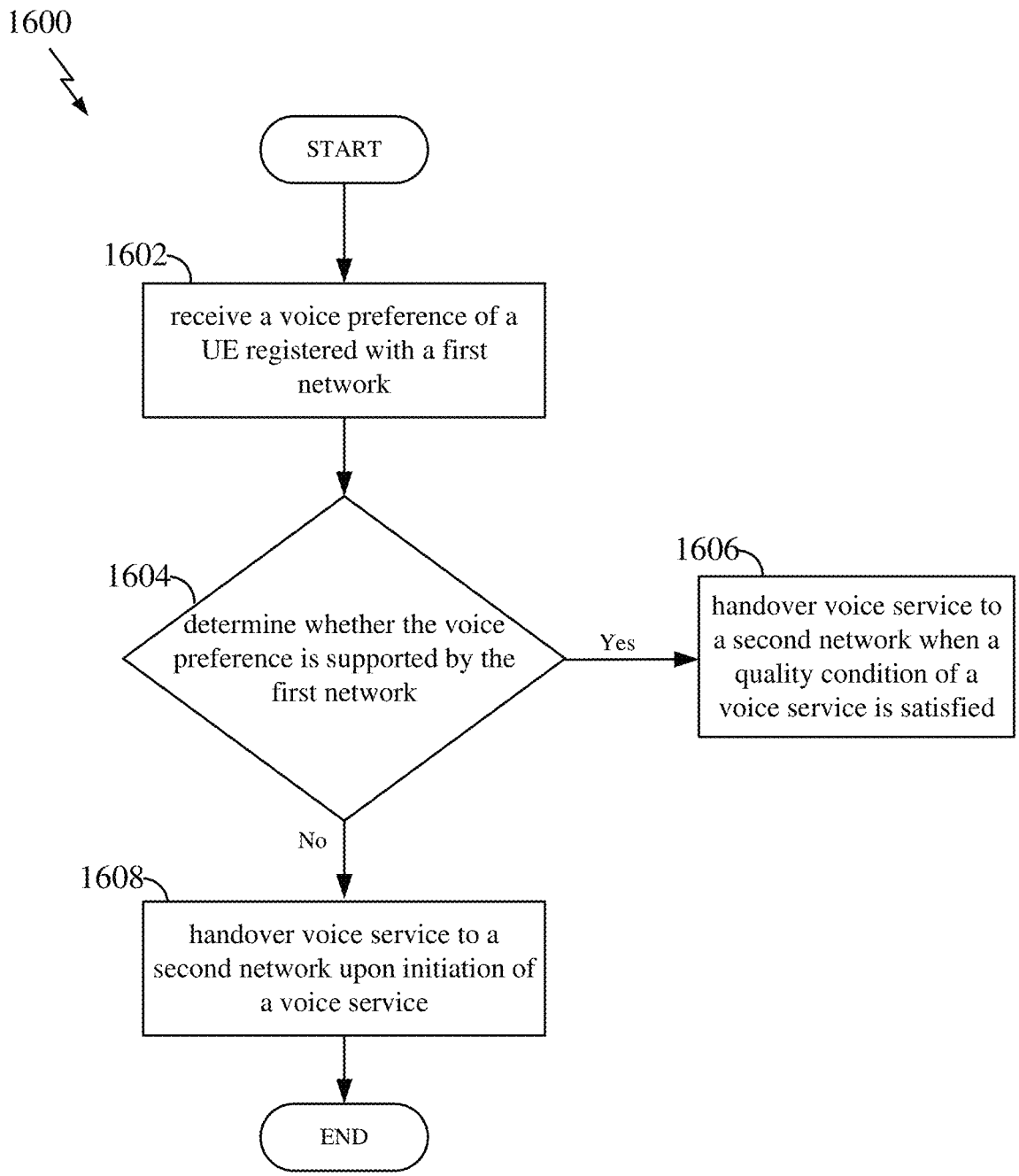
FIG. 16 is a flow chart illustrating an exemplary process for configuring a voice domain preference of a UE in accordance with some aspects of the present disclosure.

FIG. 16 is a flow chart illustrating an exemplary process 1600 for voice service handover to a preferred voice domain and/or preferred RAT. As described below, some or all illustrated features may be omitted in a particular implementation within the scope of the present disclosure, and some illustrated features may not be required for implementation of all embodiments. In some examples, the process 1600 may be carried out by the UE/RAN node 1400 illustrated in FIG. 14. In some examples, the process 1600 may be carried out by the MME/AMF 1500 illustrated in FIG. 15.

In some examples, the process 1600 may be carried out by any suitable apparatus or means for carrying out the functions or algorithm described below.

At block 1602, the UE/RAN node 1400 may receive a voice domain preference. The voice domain preference may be configured to the UE/RAN node 1400 by the home public land mobile network (HPLMN) via open mobile alliance (OMA) device management (DM) protocol and may be indicative of the voice capabilities of the UE/RAN node 1400. The voice domain preference may include one or more preferences for voice services. For example, the voice domain preference may simply be circuit switched (CS) voice only, or IMS PS voice only. Alternatively, the voice domain preference may include both a preferred voice service and a secondary voice service. For example, the voice domain preference may include CS voice preferred and IMS PS voice secondary, or IMS PS voice preferred and CS voice secondary. The UE/RAN node 1400 may already be registered with at least a first radio access technology (RAT) configured to provide voice and non-voice services.

At block 1604, the UE/RAN node 1400 may determine, via the voice domain preference circuit 1440, whether the received voice domain preference corresponds to the first RAT. Once the voice domain preference is received, the UE/RAN node 1400 may determine to establish dual registration by maintaining registration with the first RAT while also registering with a second RAT that corresponds to, or supports, the preferred voice domain or the secondary voice domain of the UE/RAN node 1400. For example, if the UE/RAN node 1400 receives a voice domain preference that includes IMS PS voice preferred and CS voice secondary, and the UE/RAN node is already registered with a first RAT that supports IMS PS voice, the UE/RAN node 1400 may determine to register with a second RAT that supports CS voice while also maintaining registration with the first RAT.

At block 1604, the UE/RAN node 1400 may determine whether the voice domain preference is supported by the first RAT. In one example, the UE/RAN node 1400 determines if either the preferred or the secondary voice domain are supported by the first RAT. If the preferred voice domain is not supported by the first RAT, then the UE/RAN node 1400 may determine to register with a second RAT that supports the preferred voice domain (or the secondary voice domain) The UE/RAN node 1400 may operate using dual connectivity, maintaining registration to both of the first RAT and the second RAT.

At block 1606, if the voice domain preference is supported by the first RAT, the UE/RAN node 1400 may use the first RAT for voice services but may switch to the second RAT when one or more QoS requirements of the voice service are not being met. For example, the UE/RAN node 1400 may determine that the QoS requirements for a voice service are not being met. For example, the call quality or the channel conditions may deteriorate beyond a certain threshold, or may be trending toward deterioration beyond the threshold. Once the determination is made, the UE/RAN node 1400 may switch or fallback to the second RAT in order to utilize the secondary voice domain preference.

At block 1608, if the voice domain preference is not supported by the first RAT, the UE/RAN node 1400 may switch to the second RAT upon initiation of a voice service. For example, upon connection establishment, initiation, and/or reception of a voice call, the UE/RAN node 1400 may switch from the first RAT to the second RAT in order to utilize the voice domain preference.

Figure 17:
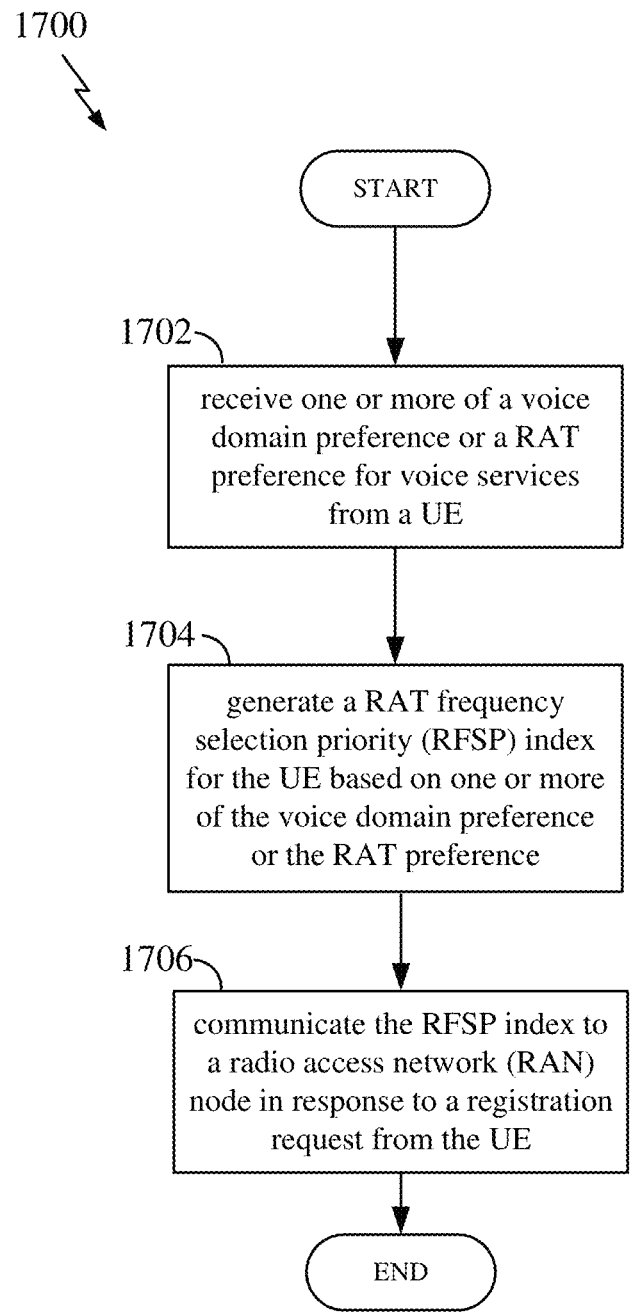
FIG. 17 is a flow chart illustrating an exemplary process for supporting a UE preferred voice domain and/or RAT preference for IMS voice, in accordance with some aspects of the present disclosure.

FIG. 17 is a flow chart illustrating an exemplary process 1700 for supporting a preferred voice domain and/or preferred RAT of a UE/RAN node 1400. As described below, some or all illustrated features may be omitted in a particular implementation within the scope of the present disclosure, and some illustrated features may not be required for implementation of all embodiments. In some examples, the process 1700 may be carried out by the MME/AMF 1500 illustrated in FIG. 15. In some examples, the process 1600 may be carried out by any suitable apparatus or means for carrying out the functions or algorithm described below.

At block 1702, the MME/AMF 1500 may receive a voice preference from a UE/RAN node 1400. The voice preference may include one or more of a voice domain preference and/or a voice RAT preference for voice services of the UE/RAN node 1400.

At block 1704, the MME/AMF 1500 may utilize the RFSP selection circuitry 1542 to generate a RAT/frequency selection priority (RFSP) index for the UE based on one or more of the voice domain preference or the voice RAT preference.

At block 1706, the MME/AMF 1500 may communicate the RFSP index to the UE/RAN node 1400 in response to a registration request from the UE.

Additional Considerations

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication operable at a radio access network (RAN) node, the method comprising:
   receiving, from a user equipment (UE), a voice preference of the UE, the voice preference including a voice radio access technology (RAT) preference that specifies at least one RAT that is preferred for voice service of the UE,
   the at least one RAT providing access to at least one air interface used by the UE to communicate via allocated resources within at least one service area or cell, the voice RAT preference including a primary voice RAT preference and a secondary voice RAT preference;
   determining whether the primary voice RAT preference or the secondary voice RAT preference of the voice RAT preference is supported by a first network to which the UE is registered;
   determining whether one or more quality of service (QoS) requirements associated with the voice service are satisfied by the first network during an ongoing call utilizing the voice service; and handing over the voice service of the UE to a second network that supports the primary voice RAT preference or the secondary voice RAT preference of the voice RAT preference of the UE while maintaining registration of the UE with the first network, wherein handing over the voice service of the UE to the second network occurs when:

a determination is made that the primary voice RAT preference or the secondary voice RAT preference of the voice RAT preference is supported by the first network and that the one or more QoS requirements associated with the voice service are not satisfied by the first network during the ongoing call utilizing the voice service.

2. The method of claim 1, wherein the voice preference includes a voice domain preference of the UE.

3. The method of claim 2, wherein the voice domain preference includes one or more of:
a circuit switched (CS) voice,
IP multimedia subsystem (IMS) packet-switched (PS) voice,
circuit switched fallback (CSFB), or
voice over new radio (VoNR).

4. The method of claim 1, wherein the voice RAT preference includes one or more of:
a 5G New Radio (NR) communications standard,
a long-term evolution (LTE) communications standard, or
an evolved LTE (eLTE) communications standard.

5. The method of claim 1, further comprising communicating the voice preference to the first network via an information element (IE), wherein the voice preference is indicative of a voice capability of the UE.

6. The method of claim 5, wherein the IE is communicated via a control plane (N2) interface, and wherein the IE includes one or more of:
a primary voice domain preference and a secondary voice domain preference, or
the primary voice RAT preference and the secondary voice RAT preference.

7. The method of claim 6, wherein the primary voice domain preference is communicated using a first field of the IE, and wherein the primary voice RAT preference is communicated using a second field of the IE.

8. The method of claim 1, further comprising:
registering the UE with the second network while maintaining the registration of the UE with the first network; and
utilizing the first network for non-voice services.

9. The method of claim 1, wherein the indication of at least one RAT that is preferred for voice service of the UE specifies:
one or more of a set of RATs preferred for the voice service of the UE including a 5G New Radio (NR) RAT, a long-term evolution (LTE) RAT, and an evolved LTE (eLTE) RAT.

10. The method of claim 1, wherein the primary voice RAT preference is preferred by the UE over the secondary voice RAT preference.

11. A radio access network (RAN) node configured for wireless communication, comprising:
means for receiving, from a user equipment (UE), a voice preference of the UE, the voice preference including a voice radio access technology (RAT) preference that specifies at least one RAT that is preferred for voice service of the UE,
the at least one RAT providing access to at least one air interface used by the UE to communicate via allocated resources within at least one service area or cell, the voice RAT preference including a primary voice RAT preference and a secondary voice RAT preference;
means for determining whether the primary voice RAT preference or the secondary voice RAT preference of the voice RAT preference is supported by a first network to which the UE is registered;
means for determining whether one or more quality of service (QoS) requirements associated with the voice service are satisfied by the first network during an ongoing call utilizing the voice service; and
means for handing over the voice service of the UE to a second network that supports the primary voice RAT preference or the secondary voice RAT preference of the voice RAT preference of the UE while maintaining registration of the UE with the first network, wherein handing over the voice service of the UE to the second network occurs when:

a determination is made that the primary voice RAT preference or the secondary voice RAT preference of the voice RAT preference is supported by the first network and that the one or more QoS requirements associated with the voice service are not satisfied by the first network during the ongoing call utilizing the voice service.

12. The RAN node of claim 11, wherein the voice preference includes a voice domain preference of the UE.

13. The RAN node of claim 12, wherein the voice domain preference includes one or more of:
a circuit switched (CS) voice,
IP multimedia subsystem (IMS) packet-switched (PS) voice,
circuit switched fallback (CSFB), or
voice over new radio (VoNR).

14. The RAN node of claim 11, wherein the voice RAT preference includes one or more of:
a 5G New Radio (NR) communications standard,
a long-term evolution (LTE) communications standard, or
an evolved LTE (eLTE) communications standard.

15. The RAN node of claim 11, further comprising means for communicating the voice preference to the first network via an information element (IE), wherein the voice preference is indicative of a voice capability of the UE.

16. The RAN node of claim 15, wherein the IE is communicated via a control plane (N2) interface, and wherein the IE includes one or more of:
a primary voice domain preference and a secondary voice domain preference, or
the primary voice RAT preference and the secondary voice RAT preference.

17. The RAN node of claim 11, further comprising:
means for registering the UE with the second network while maintaining the registration of the UE with the first network; and
means for utilizing the first network for non-voice services.

* * * * *